United States Patent [19]

Drzewinski

[11] Patent Number: 5,292,809
[45] Date of Patent: Mar. 8, 1994

[54] BLENDS OF POLYCARBONATE CONTAINING FLUORINATED-BISPHENOL A AND POLYMETHYL METHACRYLATE

[75] Inventor: Michael A. Drzewinski, Princeton Junction, N.J.

[73] Assignee: Enichem S.p.A., Milan, Italy

[21] Appl. No.: 891,036

[22] Filed: Jun. 1, 1992

[51] Int. Cl.$^5$ .................. C08L 69/00; C08L 33/12
[52] U.S. Cl. ..................................... 525/147; 525/148
[58] Field of Search ............. 525/57, 133, 147, 148

[56] References Cited

U.S. PATENT DOCUMENTS

| | | | |
|---|---|---|---|
| 4,319,003 | 3/1982 | Gardlund | 525/148 |
| 4,346,211 | 8/1982 | Krishnan et al. | 528/202 |
| 4,379,910 | 3/1983 | Mark et al. | 528/202 |
| 4,548,997 | 10/1985 | Mellinger et al. | 525/433 |
| 4,743,654 | 5/1988 | Kyu et al. | 525/148 |
| 4,745,029 | 5/1988 | Kambour | 525/148 |
| 4,906,696 | 3/1990 | Fischer et al. | 525/148 |
| 5,106,906 | 4/1992 | Meier | 525/148 |

FOREIGN PATENT DOCUMENTS

| | | |
|---|---|---|
| 0297285 | 1/1989 | European Pat. Off. |
| 2264268 | 7/1973 | Fed. Rep. of Germany |
| 3632946 | 3/1988 | Fed. Rep. of Germany |
| 3833218 | 4/1990 | Fed. Rep. of Germany |

OTHER PUBLICATIONS

Polymer, vol. 32, No. 2, pp. 272–278, 1991, M. Nishimoto, et al., "Role of Slow Phase Separation in Assessing The Equilibrium Phase Behavior of PC PMMA Blends".
Polymer Preprints, vol. 23, No. 1, pp. 258–259, Mar. 1982, Z. G. Gardlund, "Thermal and Dynamic Mechanical Analysis of Polycarbonate(Methyl Methacrylate) blends".
Advances in Chemistry, vol. 206, No. 9, pp. 129–148, 1984, Z. G. Gardlund, "Properties and Morphology of Poly(Methyl Methacrylate)/Bisphenol A Polycarbonate Blends".
Polymer Letters, vol. 3, pp. 1053–1058, 1965, H. Abe, et al., "Syndiotactic Polymerization of Methyl Methacrylate (1)".
Encyclopedia of Polymer Science and Engineering, Second Edition, vol. 2, pp. 280–286.

Primary Examiner—David J. Buttner
Attorney, Agent, or Firm—Oblon, Spivak, McClelland, Maier & Neustadt

[57] ABSTRACT

Bisphenol A polycarbonate containing at least 15 mole % of fluorinated bisphenol monomer units such as 2,2-bis-(4-hydroxyphenyl) hexafluoropropane (6F-Bisphenol A) can be blended with polymethyl methacrylate (PMMA) to form thermodynamically miscible, transparent, single phase blends at all compositions.

6 Claims, No Drawings ns of PC and PMMA as immiscible in most proportions.

BLENDS OF POLYCARBONATE CONTAINING FLUORINATED-BISPHENOL A AND POLYMETHYL METHACRYLATE

BACKGROUND OF THE INVENTION

1. Field of the Invention:

This invention pertains to mixtures of polymethyl methacrylate (PMMA) and polycarbonates which contain at least 15 mole % of fluorinated bisphenol monomer units (F-PC) such as 2,2-bis-(4-hydroxyphenyl)-hexafluoropropane (6F-bisphenol A), herein referred to as F-PC. Blends of F-PC and PMMA are thermodynamically miscible, single phase systems which are transparent in all ratios.

2. Discussion of the Background:

Blends of polycarbonates and polymethyl methacrylates are known. Generally, polycarbonates exhibit properties such as high temperature stability, good dimensional stability, high impact strength, good stiffness and most notably good transparency. For these reasons, PC is used in a variety of applications including glass replacement, housings, medical devices and containers. Nevertheless, PC does have drawbacks such as poor scratch resistance, poor long-term U.V. resistance and stress birefringence which have to be dealt with, particularly in demanding optical applications.

Polymethyl methacrylates, on the other hand, are limited by their relatively poor dimensional stability, low impact strength and low temperature stability. They are, however, known for their clarity, surface hardness, U.V. resistance and generally good weatherability and chemical resistance. For this reason, they are extensively used in applications such as window glazings, aircraft windows and automotive lenses/lightcovers.

Blends of PC and PMMA would therefore be expected to eliminate the individual deficiencies of the respective components and result in a material having considerably improved mechanical and optical properties for a wide range of applications. Unfortunately, blends of PC and typical polymethyl methacrylates are not thermodynamically miscible at most compositions and their mixtures result in opaque materials which are not acceptable for transparent, optical applications. The technical literature has previously debated the miscibility of these mixtures but the current understanding (for example see Polymer, Volume 32, page 272, 1991) shows that traditional, free-radically polymerized PMMA does not form a single, thermodynamically miscible, transparent blend but does demonstrate mechanical compatibility with PC. The term "thermodynamically miscible" refers to a polymer blend that is mixed on the molecular level so as to form a single homogeneous phase which exhibits only one glass transition. In contrast, the term "mechanically compatible" is taken to mean that mixing of the polymers is on a small scale but larger than the molecular level. Furthermore, "mechanically compatible" implies that the multiple phases exhibit good adhesion to one another so as to yield good mechanical properties. Although both thermodynamically miscible and mechanically compatible blends exhibit good mechanical properties, thermodynamically miscible blends will generally be stronger, and only thermodynamically miscible blends are transparent, owing to their single phase nature.

Many references now exist which describe mixtures of PC and PMMA as immiscible in most proportions. For example, U.S. Pat. No. 4,319,003 teaches that blends of PC and PMMA are opaque and do not possess the advantageous properties exhibited by either polymer. In *Polymer Preprints*, Volume 23, pages 258-259, 1982 and in *Advances in Chemistry*, Volume 206, Number 9, pages 129-148, 1984, indications of immiscibility in all typical PC/PMMA blends are reported; as a matter of fact, these blends were observed to be opaque over the entire composition range. Among several other references which confirm that these mixtures are immiscible ar JP 7216063 and EP 0297285.

Ways of overcoming the drawbacks associated with the immiscibility of typical PC/PMMA blends have been previously proposed. Among them, the addition of copolymer additives (DE 2264268); PMMA/acrylamide copolymers (DE 3632946); and PMMA-ester copolymers containing carboxylic groups (U.S. 4,906,696). In U.S. Pat. No. 4,319,003, the use of a block copolymer of PC and PMMA instead of a physical mixture of the two components is proposed.

Similarly, processes have been developed and proposed which can also produce transparent PC/PMMA blends. According to DE 3,833,218, transparent mixtures of aromatic polycarbonates and polyalkyl methacrylates can be produced by melting the two components in the presence of a supercritical gas. Also, U.S. Pat. Nos. 4,743,654 and 4,745,029 disclose that one may produce solutions of the two polymers in organic solvents, allow the organic solvent to evaporate and thus produce a transparent material. Unfortunately all of these methods suffer from the drawback of bubble formation and other imperfections in the final product which would render them unsuitable for many applications. Since care must be taken in such processes, these methods most certainly would be relatively slow in comparison to traditional melt forming processes such as all forms of extrusion and molding and most likely would be limited to thin films as opposed to larger, more bulkier articles. A further disadvantage could be deterioration of properties and breakage arising from separation of the two phases since a blend produced by such processes would be metastable.

Accordingly the task existed of discovering and producing transparent PC/PMMA blends which exhibit all of the beneficial properties expected of such a mixture which is processable by known melt processing techniques.

SUMMARY OF THE INVENTION

It is an object of this invention to provide a thermoplastic, melt processable composition which is a thermodynamically miscible or mechanically compatible, single phase, transparent blend of polycarbonate containing at least 15 mole % of fluorinated monomer blended with polymethyl methacrylate.

It is another object of this invention to prepare blends of polycarbonate containing at least 15 mole% of 6F-bisphenol A blended with polymethyl methacrylate in which these two polymers are thermodynamically miscible and form a stable, single phase material at all compositions.

DETAILED DESCRIPTION OF THE PREFERRED EMBODIMENTS

It is possible to achieve transparent and thermodynamically miscible blends which consist of:

(I) 1 to 99 weight % of polymethyl methacrylate (PMMA) and (II) 99 to 1 weight % of an aromatic polycarbonate containing at least 15 mole % of monomer units having fluorinated alkyl or fluorinated aryl side chains, such as 2,2-bis-(4-hydroxy phenyl)hexafluoropropane units (6F-PC).

Surprisingly, the polymer mixtures in accordance with this invention are thermodynamically miscible and mechanically compatible over the entire range of compositions, however, blends containing more than 5 weight % and preferably 10 weight % of either component are practically more interesting. The F-PC/PMMA blends of this invention are clear and transparent, in marked contrast to the prior art PC/PMMA blends mentioned above which are opaque.

The polymethyl methacrylate used in this invention can be any of a number of different varieties including extrusion, blow molding and injection moldable grades which can be produced by a number of synthetic methods including various free radical, ionic and coordination techniques (bulk, suspension, solution, dispersion, emulsion, etc). Azo compounds such as azobisisobutyronitrile, or peroxides such as dibenzoyl peroxide, or redox systems can be used as radical polymerization initiators. The weight average molecular weight may be in the range of about 10,000 to about 2 million, although this is not critical to the basis of the invention. The preferred molecular weight is from 30,000 to about 300,000.

Generally preferred polymethyl methacrylate is commercially available under such trade names as Plexiglas (Rohm & Haas), Cyrolite (Cyro) and Zylar (Novacor). These materials are typically characterized by a melt flow rate of 3-30 g/10 minutes. Another preferred polymethyl methacrylate material is commercially available from Polysciences, Inc. and has a molecular weight of 100,000. Still another preferred material is available from Scientific Polymer Products having an intrinsic viscosity of 0.45 which corresponds to a molecular weight of 75,000.

the aromatic polycarbonates of the present invention have the formula

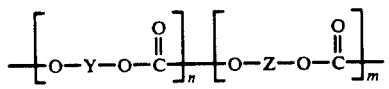

wherein Y is

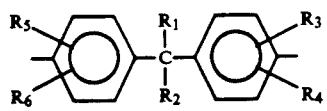

wherein $R_1$ and $R_2$ independently are fluorinated $C_1-C_6$ alkyl or fluorinated $C_6-C_{10}$ aryl groups; and $R_3$, $R_4$, $R_5$ and $R_6$ are each independently hydrogen, $C_1-C_3$ alkyl, chlorine and bromine;

Z is a radical of the formula

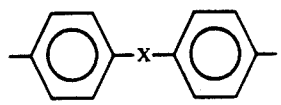

wherein X is $C_1-C_6$ straight or branched alkyl, carbonyl, sulfonyl, oxygen, sulfur or a single bond; n is an integer between 5 and 10,000, m is an integer of 0-10,000, provided $n \geq 0.15 (m+n)$.

Examples of Z include 2,2-bis(4-hydroxyphenyl)propane, bis-(4-hydroxyphenyl)methane, 2,2-bis(4-hydroxyphenyl)propane, bis-(4-hydroxyphenyl)methane, 2,2-bis(4-hydroxy-3-methylphenyl) propane, 4,4-bis(4-hydroxyphenyl)heptane, 2,2-bis (4-hydroxyphenyl), hydroxyphenyl)heptane, 2,2-bis(4-hydroxyphenyl)ether, 2,2-bis (4-hydroxyphenyl)sulfone, 2,2-bis(4-hydroxyphenyl)ketone, 2,2-bis(4-hydroxyphenyl)thiol, 2,2-bis(4-hydroxyphenyl)-diphenylmethane, 2,2-bis(4-hydroxyphenyl)phenylethane, 2,2-bis (3,5-dimethyl, 4-hydroxyphenyl)propane. Further compounds can be found, for example, in "Chemistry and Physics of Polycarbonates" by H. Schnell (Interscience Publishers, Inc. 1964).

Examples of Y are 2,2-bis-(4-hydroxy)hexafluoropropane, 2,2-bis(4-hydroxyphenyl)hexafluoropropane, 2,2-bis(4-hydroxyphenyl)difluoromethane, 2,2-bis(4-hydroxyphenyl) difluoromethan, 2,2-bis(4- hydroxyphenyl)-pentafluorophenyl methane, 2,2-bis(3,5-difluoro, 4-hydroxyphenyl) propane, 2,2-bis(3,5-difluoro, 4-hydroxyphenyl)-methane, 2,2-bis(3,5-difluoro, 4-hydroxyphenyl)thiol, 2,2-bis (3,5-difluoro, 4-hydroxyphenyl)ether, 2,2-bis(3,5-difluoro, 4-hydroxyphenyl)sulfone, 2,2-bis(3,5-difluoro, 4-hydroxyphenyl)ketone, 2,2-bis(3,5-difluoro, 4-hydroxyphenyl)-keytone, 2,2-bis(3,5-difluoro, 4-hydroxyphenyl) hexafluoropropane.

The polycarbonates are produced by reacting di(-monohydroxyaryl)-alkanes, dihydroxybenzenes and/or halogen-substituted derivatives thereof with derivatives of carbonic acid such as carbonic acid diesters, phosgene, bis-chlorocarbonic acid esters of di-(monohydroxyaryl)-alkanes, and the bis-chloro-carbonic acid esters of dihydroxybenzenes. These polymers can be manufactured by known processes as described in U.S. Pat. No. 4,548,997.

Aromatic polycarbonates are typically prepared using a molecular weight regulator, an acid acceptor and a catalyst. The molecular weight regulators which can be employed include phenol, cyclohexanol, methanol and para-tert-butylphenol. The acid acceptor can be either an organic or an inorganic base. Suitable organic bases include alkyl and aromatic amines such as pyridine, triethylamine, dimethylaniline and tributylamine. Suitable inorganic bases include the hydroxides, carbonates, bicarbonates and phosphates of alkaline or alkaline earth metals.

The catalysts which can be employed are those that promote esterification of the hydroxy monomer with the carbonic acid derivative including tertiary amines such as triethylamine, triisopropylamine, N,N,-dimethylaniline, quaternary ammonium compounds, such as tetraethylammonium bromide and benzyl trimethylammonium chloride, and quaternary phosphonium compounds such as N-butyltriphenylphosphonium bromide.

Polycarbonate resins prepared from mixtures of 2,2-bis-(4-hydroxyphenyl)propane (Bisphenol A) and 2,2-bis-(4-hydroxyphenyl)hexafluoropropane (6F-bisphenol A) are already known in the art. U.S. Pat. No. 4,346,211 describes 6F-PC and its use in the manufacturing of articles requiring higher heat distortion than traditional bisphenol A PC. Another use of these 6F-PC resins is as a flame retardant in blends with acrylic resins (U.S. Pat. No. 4,379,910).

The preferred blends of this invention are binary blends of PMMA and F-PC. Additional polymers may also be present in minor amounts but must be miscible in order for the resultant blend to be clear and transparent. The total amount of any additional polymer(s) is generally less than 20 weight % (relative to combined weights of PMMA and F-PC) with the ratio of PMMA to F-PC remaining the same as binary blends, i.e., about 1 to 99 weight % (preferably 10-80%) F-PC and 99 to 1 weight % (preferably 90-20%) PMMA.

Additives such as stabilizers, antioxidants, processing aids, pigments, dyes, fillers, etc. can be incorporated as per any polymer blend if so desired. Certain additives, however, may not be desirable if they adversely affect the transparency of the blend.

One may choose to give up the benefit of transparency for greater improvement in some other property, such as impact strength or tensile strength, through the use of non-miscible additives. Thus, any polymer blend consisting essentially of PMMA and F-PC is within the scope of this invention.

Conventional additives or modifiers can be included in the blends as needed, such as fillers, stabilizers, antioxidants, pigments, dyes and impact modifiers.

Antioxidants include phenolics, hindered amines, thioesters and phosphite compounds. Suitable dyes, pigments and special color concentrates include both organic and inorganic compounds. Leading suppliers include Ferro, Harwick, Ciba-Geigy and Crowley.

Flame retardants include aluminum hydrates, halogenated compounds, antimony trioxide and phosphate esters sold by a wide variety of companies including Mobey, Ferro, Harwick and Akzo.

Ultraviolet stabilizers are generally of the benzophenone, benzotriazole or nickel-organic tapes sold by Ciba-Geigy, BASF, Ferro and American Cyanimide.

Suitable fillers include aramide fibers, glass fibers, ceramic fibers, metal fibers, carbon fibers, glass beads, minerals such as calcium carbonate, kaolin, talc, micas and silicas.

Impact modifiers include MBS modifiers sold by Rohm & Haas and AtoChem for use in BVC, PC and nylons. Kratons are sold by Shell for use in engineering resins; EPDM rubbers are used as impact modifiers in polyolefins. Commercial PC's are impact modified with either the MBS or Kraton materials.

The mixing of the components of the blends of this invention can be undertaken by many means such as codissolution in solvent and by various commonly known methods of mechanical and thermal processing such as roll mixers, kneaders, blade mixers, screw extruders and the like. The resultant blends can be further processed/shaped by similar means most commonly referred to as extrusion and molding.

The blends of this invention are transparent thermoplastic materials with a wide range of properties, in particular, more favorable properties than those exhibited by ether individual component alone. For this reason they have many commercial applications, either directly or indirectly, as a result of the miscibility of PMMA with F-PC. This includes production and use of PMMA-containing copolymers which make use of this miscibility so as to incorporate other moieties into the polycarbonate, such as functionality for further reactivity or elastomers for low temperature, thick section toughness. Suitable comonomers include butadiene, isoprene and butylacrylate, vinyl acetate, vinyl alcohol, vinylidene chloride, diethyl fumarate, dimethyl maleate and acrylic $C_1$-$C_{10}$ esters. Thus, through this discovery, one can modify polycarbonate in order to overcome deficiencies such as notch sensitivity, poor thick section toughness and poor chemical resistance.

Other features of the invention will become apparent in the course of the following descriptions of exemplary embodiments which are given for illustration of the invention and are not intended to be limiting thereof.

Example 1

A 70/30 copolymer of Bisphenol A/6F-Bisphenol A polycarbonate was prepared by reaction of the phenolic monomers with diphenyl carbonate in the presence of the transesterification catalyst tetrabutylammonium tetraphenyl borate at high temperature, 220° C. for 20 minutes under argon, evacuate to 15 mmHg then raise temperature 10° C. every 10 minutes until reaching 260° C., then 20 minutes at high vacuum (0.5 mmHg). The resultant copolymer was characterized and determined to contain 30% of the 6F-bisphenol monomer. DSC showed this material to have a glass transition of 145° C. This material was then solution blended in chloroform with free radically polymerized atactic polymethyl methacrylate (Scientific Polymer Products) at various weight ratios, coagulated in isopropanol, filtered and vacuum dried at 60° C. for several hours. Each blend was then tested by DSC after first being heated to 275° C. to remove any non-equilibrium effects and to simulate melt blending. Compression molding of these blends produced films which are highly transparent to the naked eye. The DSC was run at 20° C./minute from 25 to 275° C. and the glass transition of the mixtures recorded. The results are contained in Table 1. The single glass transition exhibited by these blends is consistent with well known behavior of thermodynamically miscible polymer blends.

Comparative Example 1

Traditional, 100% bisphenol A polycarbonate (Aldrich) and the same free radically polymerized, atactic PMMA as in Example 1 were solution blended, recovered and tested as in Example 1. The resultant blends were opaque when compression molded and exhibited two glass transitions as measured by DSC. The DSC results are contained in Table I.

TABLE I

| 6-F PC/PMMA | Example 1 | Comparative Example 1 |
| --- | --- | --- |
| 100/0 | 145 | — & 150 |
| 85/15 | 144 | 115 & 147 |
| 70/30 | 142 | 118 & 149 |
| 60/40 | 136 | 117 & 149 |
| 40/60 | 133 | 119 & 149 |
| 30/70 | 129 | 117 & 148 |
| 15/85 | 120 | 116 & 147 |
| 0/100 | 111 | 111 & — |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A composition comprising: a thermodynamically miscible blend of
   (I) 10 to 90 weight % of polymethyl methacrylate (PMMA) and (II) 90 to 10 weight % of an aromatic polycarbonate represented by the formula

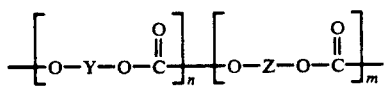

wherein Y is

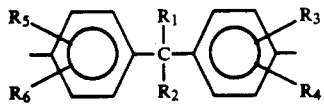

wherein $R_1$ and $R_2$ independently are fluorinated $C_1$–$C_6$ alkyl or fluorinated $C_6$–$C_{10}$ aryl group; $R_3$, $R_4$, $R_5$ and $R_6$ are each independently hydrogen, $C_1$–$C_3$ alkyl, chlorine and bromine;

Z is a radical of the formula

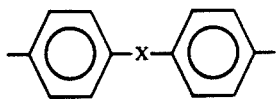

wherein X is $C_1$–$C_6$ straight or branched alkyl, carbonyl, sulfonyl, oxygen, sulfur or a single bond, n is an integer between 5 and 10,000 m is an integer of 0–10,000, provided $n \geq 0.15\,(m+n)$, wherein said composition has been melt blended and said blend of components (I) and (II) has one Tg.

2. The composition of claim 1, wherein m is 0.

3. The composition of claim 1, comprising 35–90% of component (I).

4. The composition of claim 1, wherein said polymethylmethacrylate as a number average molecular weight of 20,000 to 300,000.

5. The composition of claim 1, wherein $n \geq 0.35(m+n)$.

6. The composition of claim 1, wherein $n \geq 0.50(m+n)$.

* * * * *